United States Patent
Newton et al.

(10) Patent No.: US 9,312,035 B2
(45) Date of Patent: Apr. 12, 2016

(54) SEMI-PORTABLE EMERGENCY COOLING SYSTEM FOR REMOVING DECAY HEAT FROM A NUCLEAR REACTOR

(75) Inventors: Peter M. Newton, Richland, WA (US); David W. Wilson, Pasco, WA (US); John M. Parke, Kennewick, WA (US); James M. Wade, Richland, WA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 439 days.

(21) Appl. No.: 13/295,377

(22) Filed: Nov. 14, 2011

(65) Prior Publication Data

US 2013/0121454 A1  May 16, 2013

(51) Int. Cl.
*G21C 9/00* (2006.01)
*G21C 15/18* (2006.01)
*G21D 1/02* (2006.01)
*G21D 3/04* (2006.01)

(52) U.S. Cl.
CPC .............. *G21C 15/182* (2013.01); *G21D 1/02* (2013.01); *G21D 3/04* (2013.01); *Y02E 30/40* (2013.01)

(58) Field of Classification Search
CPC .... G21C 15/18; G21C 15/182; G21C 15/185; G21C 15/187; G21C 13/028; G21D 1/04
See application file for complete search history.

(56) References Cited

U.S. PATENT DOCUMENTS

| | | | | |
|---|---|---|---|---|
| 2,992,017 | A * | 7/1961 | Dritz | 285/22 |
| 3,601,526 | A * | 8/1971 | Bohne et al. | 174/151 |
| 4,088,381 | A * | 5/1978 | Harnett | 439/190 |
| 4,818,475 | A * | 4/1989 | Gluntz et al. | 376/282 |
| 5,268,942 | A * | 12/1993 | Newton et al. | 376/272 |
| 5,268,943 | A * | 12/1993 | Corletti et al. | 376/282 |
| 5,426,681 | A * | 6/1995 | Aburomia | 376/283 |
| 2008/0217443 | A1* | 9/2008 | Zacherl et al. | 239/722 |
| 2011/0126928 | A1* | 6/2011 | Roit et al. | 137/561 R |
| 2012/0250813 | A1* | 10/2012 | Lloyd et al. | 376/298 |

OTHER PUBLICATIONS

Biello, D., "Anatomy of a nuclear Crisis: A Chronology of Fukushima," Mar. 21, 2011.*

* cited by examiner

*Primary Examiner* — Jack W Keith
*Assistant Examiner* — Sharon M Davis
(74) *Attorney, Agent, or Firm* — Richard J. Coldren; Westinghouse Electric Company LLC (57) ABSTRACT

An emergency temporary spent fuel pool cooling system for a nuclear power generating facility that has a permanently installed primary loop within the nuclear containment and a mobile temporary secondary loop. The secondary loop is housed in transport vehicles that can be stored off site and is connectable in heat exchange relationship with the primary loop through quick disconnect couplings that are accessible on the outside of the reactor containment. The transport vehicles also include self-contained power and compressed air sources for powering and controlling the entire emergency cooling system. The system also has a make-up water injection capability for refueling the spent fuel pool and secondary loop.

9 Claims, 5 Drawing Sheets

SEMI-PORTABLE EMERGENCY COOLING SYSTEM FOR REMOVING DECAY HEAT FROM A NUCLEAR REACTOR

CROSS REFERENCE TO RELATED PATENTS

This application is an improvement on U.S. Pat. No. 5,268,942, issued Dec. 7, 1993 and assigned to the Assignee of this application.

BACKGROUND

1. Field

This invention relates generally to cooling systems used to cool water in a nuclear reactor power generating facility and, more particularly, to a temporary cooling system which is designed to supplement existing cooling systems and accommodate emergency conditions experienced in such a facility.

2. Related Art

In nuclear power generating facilities, a reactor vessel housing nuclear fuel and water is positioned in what is commonly referred to as a refueling cavity or a reactor cavity. During power generation, a primary fluid coolant, normally water, is heated by the nuclear fuel, and the heat is used to generate steam for electric power generation. During shutdowns for refueling and other periods when the reactor is not operating, the decay heat from the fuel continues to heat the water in the reactor vessel. The water must be cooled to a desired level before the fuel may be removed from the vessel and transferred to a spent fuel pool of the facility by way of the reactor cavity. The residual decay heat generated by the reactor core is cooled during shutdown by a permanently installed residual heat removal system. The residual heat removal system provides heat exchange cooling for the decay heat coming from the fuel in the reactor core during shutdown. The heat removal capacity of this system is necessarily large. During normal shutdown, the residual heat removal system is operated for a number of days in order to remove the decay heat from the fuel to a point where the fuel may be removed from the core. This is due to the fact that the spent fuel pool, the eventual storage place for the fuel, has a permanently installed cooling system, which does not have sufficient cooling capacity to remove the high level of residual heat generated by the fuel immediately following plant shutdown.

Thus, in situations requiring removal of the fuel from the reactor core, the permanent cooling system configuration in present day nuclear plants requires that the residual heat removal system be operated for a period of days in order to cool the fuel to a point where it can be safely removed to the spent fuel pool, to permit reactor servicing, such as refueling or the decontamination of components such as the reactor recirculation system. U.S. Pat. No. 5,268,942 describes an auxiliary cooling system that can be permanently stored within the containment to augment the residual heat removal system and speed up that process. Without such an auxiliary system, the servicing crew must wait several days until the residual heat removal system adequately cools the reactor core before proceeding to remove the fuel. This cool down time increases the facility's overall shutdown period, thus increasing the cost of the shutdown operation, resulting in lost revenues, as well as the cost of replacement power purchased during the shutdown. On the other hand, the cost of such an auxiliary system or the cost of increasing the capacity of the spent fuel pool cooling system is expensive.

The Mar. 11, 2011 earthquake and tsunami in Japan lead to severe damage and station blackout at the Fukushima Dai'Ichi nuclear plant. Although the plant was successfully shut down after the earthquake, the ensuing tsunami rendered the plant unable to restore power to the cooling systems responsible for cooling the reactor and the spent fuel pool. This resulted in core meltdowns in three units, loss of water inventory, potential fuel failures in the spent fuel pools, and radioactive releases into the environment. Increased scrutiny is being focused on the world's nuclear power plants and the need to be able to respond to events that are beyond the nuclear plants' original design basis. This invention expands upon the capability of the system described in U.S. Pat. No. 5,268,942 in a way that enables an auxiliary cooling system to be rapidly mobilized and installed to provide a self-contained, self-sufficient means of removing decay heat from the spent fuel pool until normal plant equipment can be returned to service.

Thus, it is an object of this invention to provide a mobile cooling system that can be readily transported to a nuclear plant site and rapidly installed and activated to provide adequate cooling for the spent fuel pool.

It is a further object of this invention to provide such a cooling system that is self-contained, and is a self-sufficient means of removing decay heat from the spent fuel pool until normal plant equipment can be returned to service.

It is an additional object of this invention to provide such a cooling system at a reduced cost that can be spread over a number of power generating facilities at which it can be applied.

Further, it is an object of this invention to provide such a system that can be used to supply make-up water to a spent fuel pool in which the primary coolant has been depleted.

SUMMARY

These and other objects are achieved by the embodiments described herein which provide a self-powered residual heat removal system that can be transported to and rapidly connected to the containment of a nuclear power generating facility having a composite fuel pool including a reactor cavity and a spent fuel pool fluidly connected to the reactor cavity with the composite fuel pool at least partially containing a primary fluid. A nuclear reactor vessel is positioned in the reactor cavity and the reactor cavity and the spent fuel pool are housed within a containment. The self-powered residual heat removal system of the embodiments described herein include a first leg of a primary fluid heat exchange system which is fluidly connected to the composite fuel pool, in a closed loop configuration, with the first leg of the primary fluid heat exchange system entirely housed within the containment. A first pump circulates the primary fluid into, through and out of the first leg of the primary fluid heat exchange system. The first pump is housed within the containment and has a first set of electrical leads for powering the first pump that is accessible from outside of the containment. A cooler, such as a cooling tower is situated outside of the containment. A second leg of the primary fluid heat exchange system is fluidly connected to the cooler and extends from the cooler through a wall of the containment to a heat exchange interface with the first leg of the primary fluid heat exchange system within the containment. The second leg of the primary fluid heat exchange system conveys a cooling fluid between the cooler and the heat exchange interface within the containment, with the second leg of the primary fluid heat exchange system having a fluid coupling accessible outside of the containment for connecting and disconnecting a first portion of the second leg of the primary fluid heat exchange system that is within the containment to or from a second portion of the second leg of the primary fluid heat exchange system outside the containment that is connected to the cooler. A second pump of the self-powered residual heat removal system of these embodiments circulates the coolant fluid within the second leg of the primary heat exchange system between the heat exchange interface and the cooler, with the second pump having a second set of leads for powering the second pump. A portable electric generator is situated outside of the containment and has a connection to the second set of electrical leads for powering the second pump and the portable generator is connectable outside of the containment to the first set of leads to power the first pump. The self-powered heat removal system further includes at least one vehicle for transporting the second portion of the second leg of the primary fluid heat exchange system that is connectable to the cooler and the portable generator.

In one embodiment, the at least one vehicle transports the cooler and preferably the second pump, which desirably is maintained outside the containment. In another embodiment, the second leg of the primary fluid heat exchange system desirably includes means for sealing the fluid coupling when the first portion is disconnected from the second portion. Preferably, the coupling is sealed automatically when the first portion is disconnected from the second portion. Further, in a preferred mode, the fluid coupling on the second leg of the primary fluid heat exchange system is a mechanical connection. Further, in the preferred embodiment, the nuclear power generating facility includes a portable air compressor as part of the primary fluid heat exchange system. The portable air compressor is powered by the portable electric generator and is transported by the at least one vehicle. The portable air compressor is connectable to valves on the primary fluid heat exchange system to operate the valves under the power of the portable electric generator. The valves, within and outside of the containment, are accessible for coupling to the air compressor from outside of the containment. Preferably, all of the connections to the containment are made through flexible conduits.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
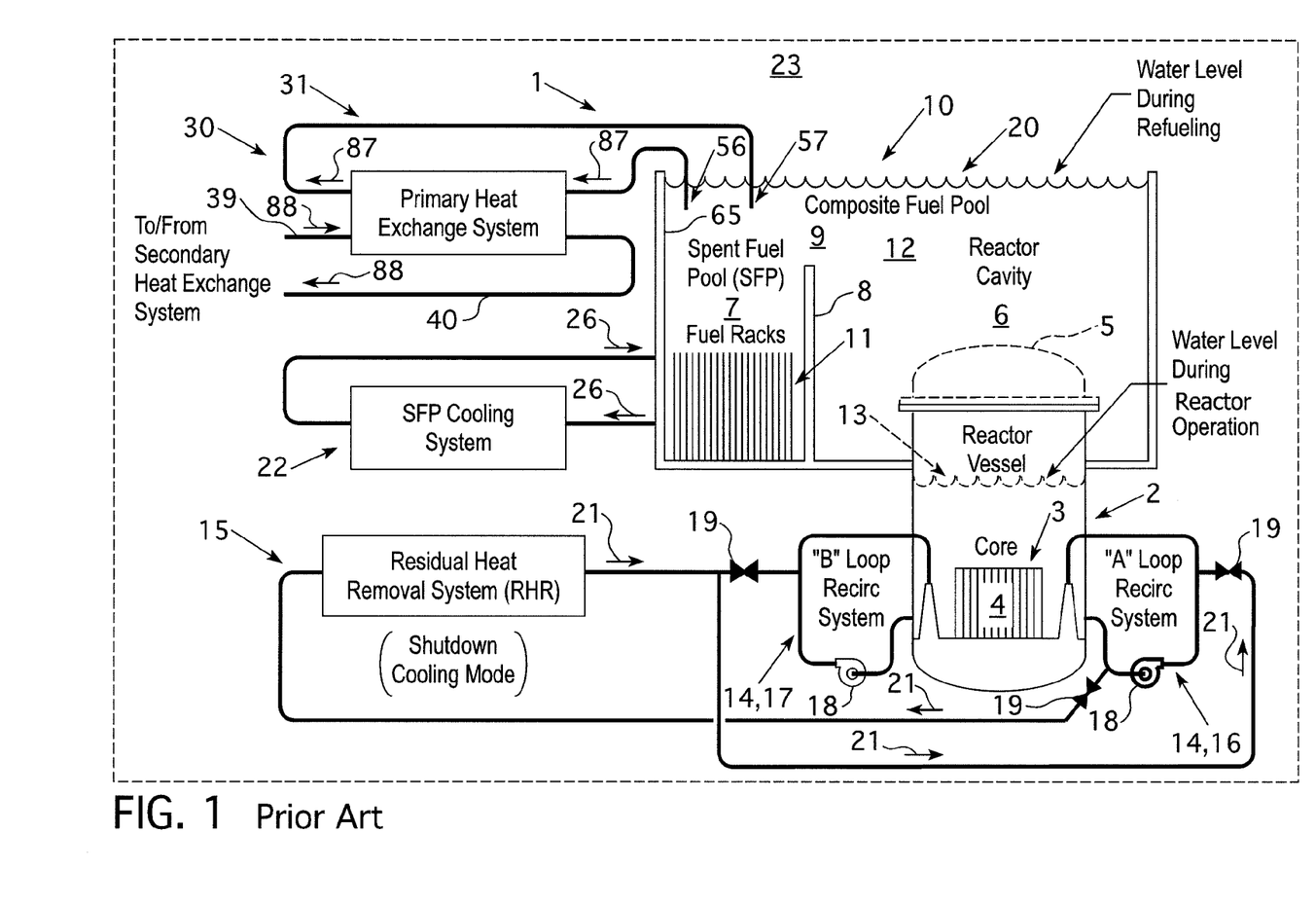
FIG. 1 is a schematic representation of the layout of the relevant components of a typical nuclear power generating facility having an embodiment of an auxiliary residual heat removal system that may employ the concepts described herein, connected thereto.

As shown in FIG. 1, in a typical nuclear power generating facility 1, only the pertinent parts of which are shown, a reactor building 23 contains a reactor vessel 2, which contains a core 3, which comprises numerous elements of nuclear fuel 4, usually in the form of fuel bundles, commonly referred to as fuel assemblies. During power generating operations reactor vessel 2 is closed by the top or head 5. Reactor vessel 2 is positioned within a reactor cavity 6 (shown in FIGS. 1 and 2), which is fluidly connected to a spent fuel pool 7 during outages. In the facility embodiment shown in FIGS. 1 and 2, the spent fuel pool 7 is separated from the reactor cavity by a wall 8 having a closable opening 9, closable by a gate (not shown) or other means known in the art to isolate the spent fuel pool 7 from the reactor cavity 6. Since various embodiments of nuclear power generating facilities 1 are possible, the spent fuel pool 7 and the reactor cavity 6 will be jointly and separably referred to as the "composite fuel pool" 10, which will refer to any point within either the spent fuel pool 7 or the reactor cavity 6. An example of an alternate embodiment of the composite fuel 10 is one wherein the spent fuel pool and the reactor cavity are separated by a conduit (not shown) rather than a wall 8. The spent fuel pool 7 typically contains fuel racks 11, which support spent fuel bundles which are stored in spent fuel pool 7.

During power generating operations, the reactor head 5 is closed and the primary fluid 12, normally referred to as the reactor coolant (typically water), is contained within the reactor vessel 2 at an operating level 13 above the core 3. The core 3 heats the primary fluid 12, which is used to generate steam which is employed as the motive power for creating electricity. The extensive piping and additional apparatus used for generating power is not relevant to the instant embodiment and is thus not shown. A reactor recirculation system 14 recirculates water within the reactor vessel 2 and is fluidly connected to a residual heat removal system 15 during shutdown. In the facility embodiment shown in FIG. 1, the reactor recirculation system 14 includes an "A" loop 16 and a "B" loop 17. Circulation is maintained by the circulation pumps 18. Valves 19 provide isolation of the reactor recirculation system 14 from the residual heat removal system 15. Of course, many different configurations of piping and valves are possible, and vary from facility to facility.

The facility 1 may be shut down for various reasons, including total or partial fuel replacement, decontamination of components, or for other reasons. Detailed shutdown procedures are required in order to maintain system safety. In order to remove the fuel bundles 4 from the core 3, the reactor head 5 is removed and the level of primary fluid 12 is raised to a refueling level 20 within the composite fuel pool 10. Following this step, the closable opening 9 is activated to an open position, allowing the primary fluid 12 to equalize the refueling level 20 within both the spent fuel pool 7 and the reactor cavity 6, once the refueling primary fluid level 20 is stable, the fuel bundles 4 may be lifted from the core 3 and placed in fuel racks 11. However, the initial decay heat from the fuel bundles 4 must first be removed during this procedure before the fuel bundles may be removed from the core.

Once the core 3 is shut down, decay heat continues to be generated by the fuel 4. The residual heat removal system 15 is a heat exchange system designed to cool the primary fluid 12, removing the initial decay heat generated upon system shutdown. As shown by the flow arrows 21, the residual heat removal system 15 cools the primary fluid 12 and recirculates the cooled primary fluid 12 back to the reactor vessel 2. As stated above, prior to the auxiliary residual heat removal system described in U.S. Pat. No. 5,268,942, the prior art method of cooling the primary fluid 12 requires operation of the residual heat removal system 15 for a number of days until the initially large amount of decay heat is removed from the primary fluid 12. The amount of heat removed during the residual heat removal system operation can be on the order of 50,000,000 BTU/hr. The residual heat removal system 15 was traditionally operated until the fuel bundles 4 were cooled to a point where they could be removed to the spent fuel pool 7, where the smaller capacity spent fuel pool cooling system 22 would continue to circulate primary fluid from the spent fuel pool 7 (as indicated by arrows 26) and remove the decay heat at a much smaller rate, for example, 1,000,000 BTU/hr. The residual heat removal system 15 and the spent fuel pool cooling system 22 are permanently installed in the facility 1. Due to the permanent nature of the installation, as well as safety, redundancy, licensing and contamination problems, modification of the permanent cooling systems would be impractical and overly expensive.

Figure 2:
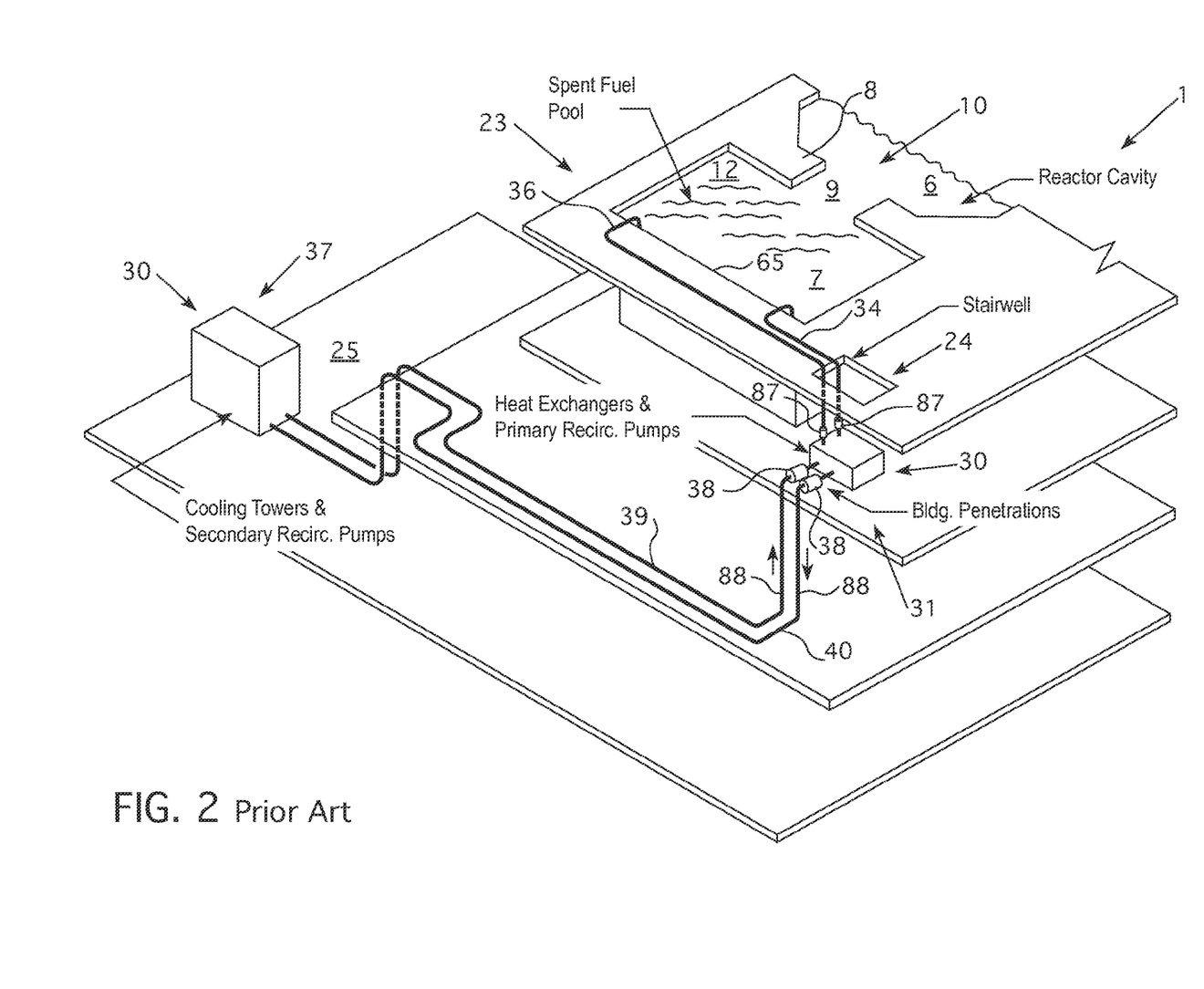
FIG. 2 is a perspective schematic illustrating the location of various components of the systems described herein, within a nuclear power generating facility.

The temporary cooling system 30, described in U.S. Pat. No. 5,268,942, provides an immediate increased cooling capacity with no additional permanent connections to the facility 1. The cooling system 30 comprises a primary heat exchange system 31, which includes a primary heat exchanger 32 for transferring heat from the primary fluid 12 to a secondary cooling fluid, a primary fluid pump 33, a primary fluid pump suction line 34, a primary fluid pump discharge line 35 and a primary fluid return line 36. Primary fluid 12 is circulated in the primary heat exchange system 31, where heat is transferred to a secondary cooling fluid from a secondary heat exchange system 37. All heat exchange equipment, pumps and other components are said to be mounted on skids 55 and temporarily located within the facility 1. Due to severe space limitations within facilities 1, components of this auxiliary residual heat removal system 30 may be located in various places within the facility 1, as shown in FIG. 2. Due to radioactive particles circulating in the primary heat exchange system 31, it is preferable to locate the primary heat exchange system 31 within the containment building 23. FIG. 2 shows a reactor containment building 23 schematically (with walls removed for clarity), with the primary heat exchange system 31 located within the building 23 near a stairwell 24. The stairwell 24 provides an opening for the primary fluid pump suction line 34 and primary fluid return line 36. Secondary heat exchange system 37 may be positioned at a point on the exterior of the containment building 23. U.S. Pat. No. 5,268,942 suggests that the roof area 25 may be an appropriate place for this secondary heat exchange system 37 recognizing that building penetrations 38 will need to be provided for the secondary cooling fluid supply line 39 and secondary cooling fluid return line 40. Alternately, the patent suggests that the secondary heat exchange system 37 may be positioned elsewhere at a point on the exterior of the building 23.

Figure 3:
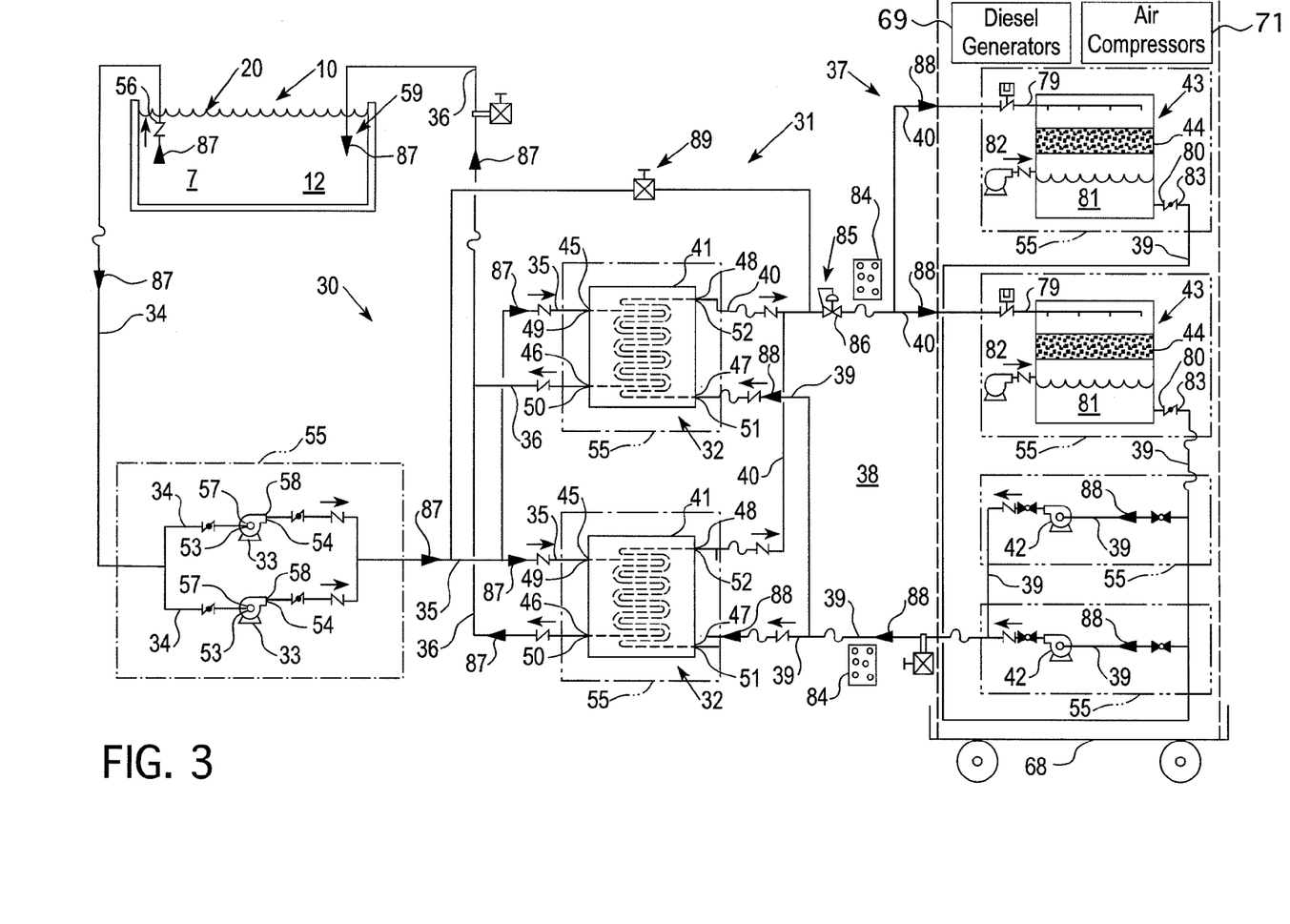
FIG. 3 is a schematic illustration showing the general workings of the auxiliary residual heat removal system described herein.

A more detailed schematic of a preferred embodiment described herein is shown in FIG. 3. The system 30 is provided with some redundancy in order to assure adequate heat exchange capacity. Thus, two primary fluid pumps 33, two primary heat exchangers 41, two secondary pumps 42 and two secondary heat exchange means 43 are provided. One or both of each of these components (if properly sized for the desired heat transfer rate) will adequately function in the system 30. The primary fluid heat exchange means 32 preferably comprises a primary fluid heat exchanger 41. A plate-type heat exchanger (such as a Graham Manufacturing Company, Inc. Model No. UFX-51 plate heat exchanger) is suitable for this application, although other heat exchange means, known in the art, such as chillers or cooling towers may be used. Primary fluid heat exchangers 41 each have a primary inlet 45, a primary outlet 46, a secondary inlet 47 and a secondary outlet 48. Primary fluid inlets 45 are fluidly connected to outlet ends 49 of the primary fluid pump discharge line 35, and primary outlets 46 are fluidly connected to inlet ends 50 of the primary fluid return line 36. Secondary inlets 47 are fluidly connected to outlet ends 51 of the secondary cooling fluid supply line 39, and secondary outlets 48 are fluidly connected to the inlet ends 52 of secondary cooling fluid return line 40. For the purposes of this disclosure, the terms "fluidly connected," or "fluidly connectable," refer to the ability for fluid to flow from one element to another element. There are numerous components, such as piping, valves, pumps, measuring devices, etc., interposed between such elements, which are desirable, but not essential for the operation of cooling system 30 and which are simply part of the fluid connection or potential fluid connection.

Primary fluid pumps 33 each have an inlet 53 and an outlet 54. The primary fluid pump suction line 34 has an inlet end 56 removably and fluidly connected to the composite fuel pool 10. Both primary fluid pump suction line 34 and primary fluid return line 36 are shown connected to the spent fuel pool 7, but may also be connected anywhere in the composite fuel pool 10, depending upon the desired flow dynamics for the particular facility 1 in which the auxiliary residual heat removal system is installed. For example, primary fluid pump suction line 34 could be connected to the reactor cavity 6 and primary fluid return line 36 could be connected to the spent fuel pool 7. Outlet ends 57 of the primary fluid pump suction line 34 are fluidly connected to the primary fluid pump inlets 53. Inlet ends 58 of the primary fluid pump discharge line 35 are fluidly connected to the primary fluid pump outlets 54. Thus, the primary fluid pumps 33 draw primary fluid 12 from the composite fuel pool 10, circulate the primary fluid through the primary heat exchanger 41 and return the primary fluid through outlet end 59 of the primary fluid return line 36, which is removably and fluidly connected to the composite fuel pool 10.

Any source of secondary cooling fluid 81 (such as water or Freon may be supplied to the primary heat exchange means 32. As shown in FIG. 3, such a source may preferably comprise a secondary heat exchange system 37. Secondary heat exchange system 37 includes secondary heat exchange means 43 for cooling secondary cooling fluid 81, which may comprise any suitable secondary heat exchangers 44, such as cooling towers, e.g., Baltimore Aircoil Company Series V cooling towers, Model VT1-N346-Q. Circulation in the secondary heat exchange system may be provided by the secondary pumps 42 or other means, such as gravity. Secondary heat exchangers 44 are provided with secondary cooling fluid inlet 79, fluidly connected to outlet ends 82 of the secondary cooling fluid return line 40, and secondary cooling fluid outlets 80, are fluidly connected to inlet ends 83 of the secondary cooling fluid supply line 39. The secondary pumps 42 may be fluidly connected in the secondary cooling fluid supply line 39, as shown, or elsewhere in the circuit as necessary, depending upon the location and type of the secondary heat exchange means 43 employed.

As shown in FIG. 3, in accordance with this embodiment, a substantial portion of the secondary heat exchange system 37 is located outside of the containment walls 84. Therefore, it is desirable that potentially radioactive primary fluid 12 be prohibited from entering the secondary heat exchange system 37. A regulator means 85 is provided for maintaining an operating pressure of the secondary cooling fluid 81 higher than the operating pressure of the primary fluid 12. One embodiment of the regulator means 85 is a back pressure valve 86, fluidly connected in the secondary fluid return line 40 between the primary heat exchange means 32 and the secondary heat exchange means 43. Back pressure valve 86 may be set to maintain an upstream pressure greater than that of the primary heat exchange system 31 such that, if a leak occurs in the primary heat exchanger 41, the secondary fluid 81 will flow into the primary heat exchange system 31, maintaining primary fluid 12 within the reactor building 23. Back pressure valve 86 may be of the type manufactured by the Ames Company, Model A820. Regulator means 85 may also include a system shutdown feature such as a differential pressure transmitter 89 which will shut down and isolate both the primary and secondary heat exchange systems if the pressure in the secondary heat exchange system 37 is not greater than the pressure in the primary heat exchange system 31. Automatic shutdown of the primary and secondary heat exchange systems is particularly desirable when the secondary heat exchange system is separated from the primary heat exchange system in accordance with this embodiment, as will be explained hereafter.

Operation of the system 30 may be observed from FIGS. 1 and 3 in which primary fluid circulation is shown by flow arrows 86 and the secondary cooling fluid circulation is shown by flow arrows 88. Initially, the reactor head 5 is removed from the reactor vessel and the level of primary fluid 12 is raised from the operating level 13 to the refueling level 20, at least partially filling the reactor cavity 6 and/or spent fuel pool 7 with primary fluid 12. U.S. Pat. No. 5,268,942 describes the cooling system 30 as being temporarily positioned in the facility 1 on skids 55 and operated as a partial or full offload of the fuel bundles 4 takes place. Primary fluid 12 is circulated within the primary heat exchange system 31, transferring heat from the primary fluid 12 at a faster rate than that attainable by the spent fuel pool cooling system 22. The secondary cooling fluid 81 is circulated in the secondary heat exchange system 37, removing the transferred heat from the secondary cooling fluid 81. During the cooling of the primary fluid 12, particulate matter may be filtered by particulate filters and demineralization may be accomplished by demineralizers placed within the flow path as explained in U.S. Pat. No. 5,268,942. Circulation is maintained in order to maintain a desired temperature of the primary fluid 12 during the outage.

This embodiment expands upon the foregoing system to address an industry-heightened focus on the ability to keep the spent fuel pool cool in emergency situations, including the loss of all plant power. The improved system comprises a permanently installed primary cooling loop located inside the reactor containment or spent fuel pool building and a portable secondary cooling loop that can be located outside of the reactor containment or spent fuel pool building. The secondary cooling loop is mobile and can be stored off site. When needed, the secondary cooling loop is transported to the site and located outside the reactor building or spent fuel pool building for either emergency or preplanned use. All connections to the heat exchange interface with the primary loop and power and compressed air interfaces to operate all of the components of the primary and secondary loops are accessible outside the containment or spent fuel pool building and are readily connectable to a portable diesel electric generator, compressor and secondary loop heat exchanger through quick disconnects located outside the containment or the spent fuel pool building walls. This approach reduces the time required for system assembly and start-up, which is especially important during emergency situations, and eliminates the need to enter the reactor building. The mobile diesel generators, air compressors, switch gear, cooling towers, secondary loop connecting piping and other support equipment required to operate this standalone primary fluid cooling system can be maintained and operated from trailers for rapid deployment.

In addition to supporting plants during emergency situations, this system can be operated in the temporary cooling mode during a refueling outage in the same manner described for the above system. Operation of this system during refueling outages can reduce fuel movement delays, based upon spent fuel pool decay heat, and improved refuel floor working conditions by reducing spent fuel pool temperatures. In addition, the secondary loop transportable equipment can be shared among a number of nuclear power generating facilities and nuclear sites to spread the overall costs of the system over a number of facilities. Thus, this invention provides electric power to run the complete auxiliary cooling system independently from installed plant electrical sources, where necessary, with a portable diesel electric generator. This embodiment further provides a portable air compressor powered by the portable diesel generator to operate system valves independent of corresponding plant services. Furthermore, this embodiment provides a means for injecting spent fuel pool make-up water into the primary fluid system, as part of the auxiliary cooling system to prevent the spent fuel from becoming uncovered.

Figure 4:
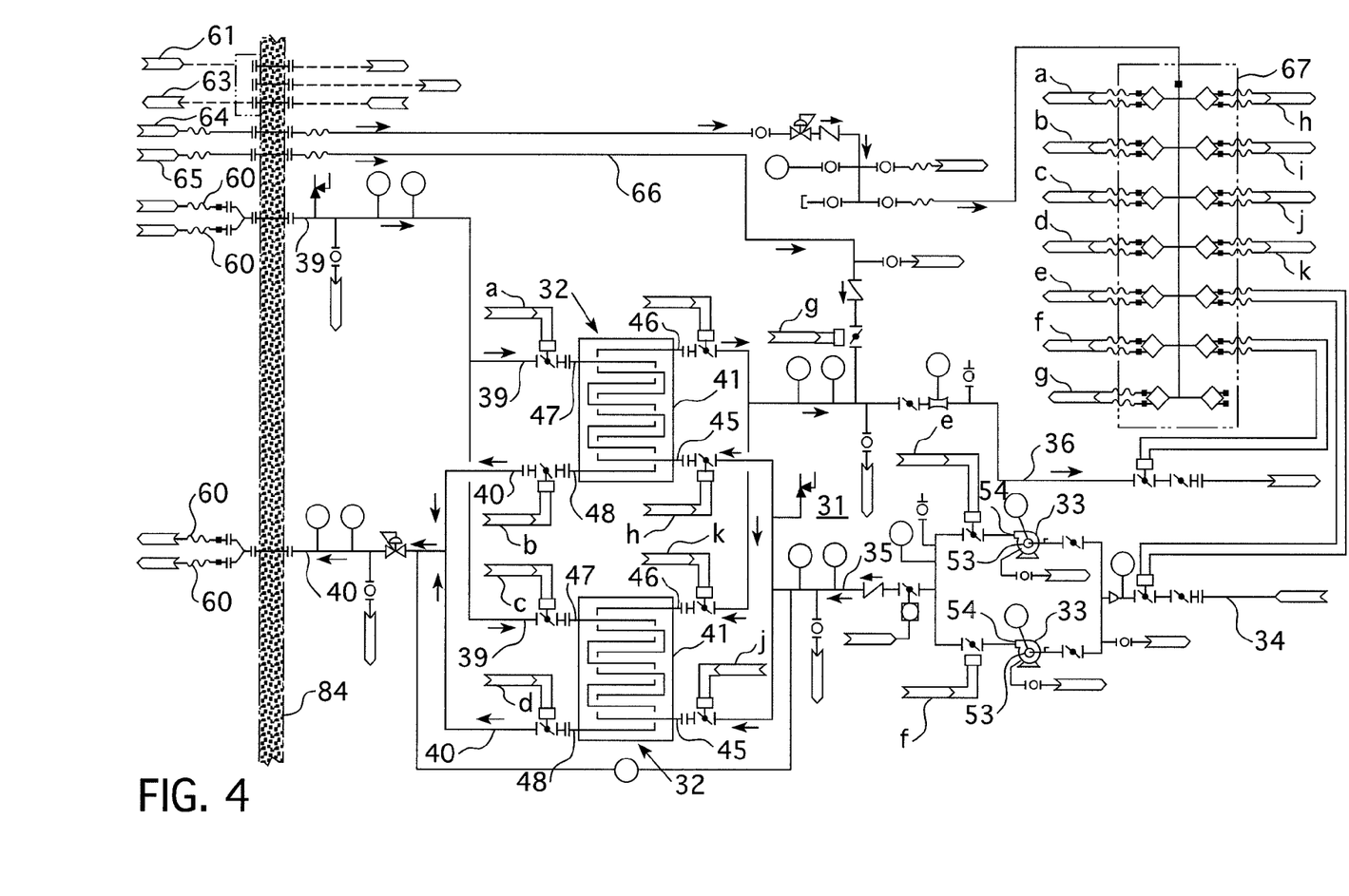
FIG. 4 is a schematic illustration of the in-containment portion of the auxiliary residual heat removal system illustrated in FIG. 3, shown in greater detail.

FIG. 4 shows the primary fluid heat exchange system 31 of this embodiment previously shown in FIG. 3 with like reference characters employed to identify corresponding components. The secondary cooling fluid supply line 39 and the secondary cooling fluid return line 40 penetrate the containment wall 84 and terminate on the outside of the containment wall in quick disconnect couplings 60. In addition to the embodiment illustrated in FIG. 3, the system shown in FIG. 4 includes an electrical switch panel 62 for transferring between diesel electric power 61 and plant power 63 for operating the primary fluid pumps 33, cooling towers 43, make-up water system 65 and an auxiliary air supply 64 for powering the various system valves. The make-up water system 65 can inject water from any of a number of sources outside of the containment, e.g., from the fire water system, a water supply tank, a pond, a reservoir, a river, etc., through injection line 66 to the primary fluid return line 36 where it can replace depleted primary water in the spent fuel pool as necessary. Compressed air from the plant or from the auxiliary air supply 64 is fed through an air distribution manifold 67 to control the various valves in the system as commanded by the plant operators.

Figure 5:
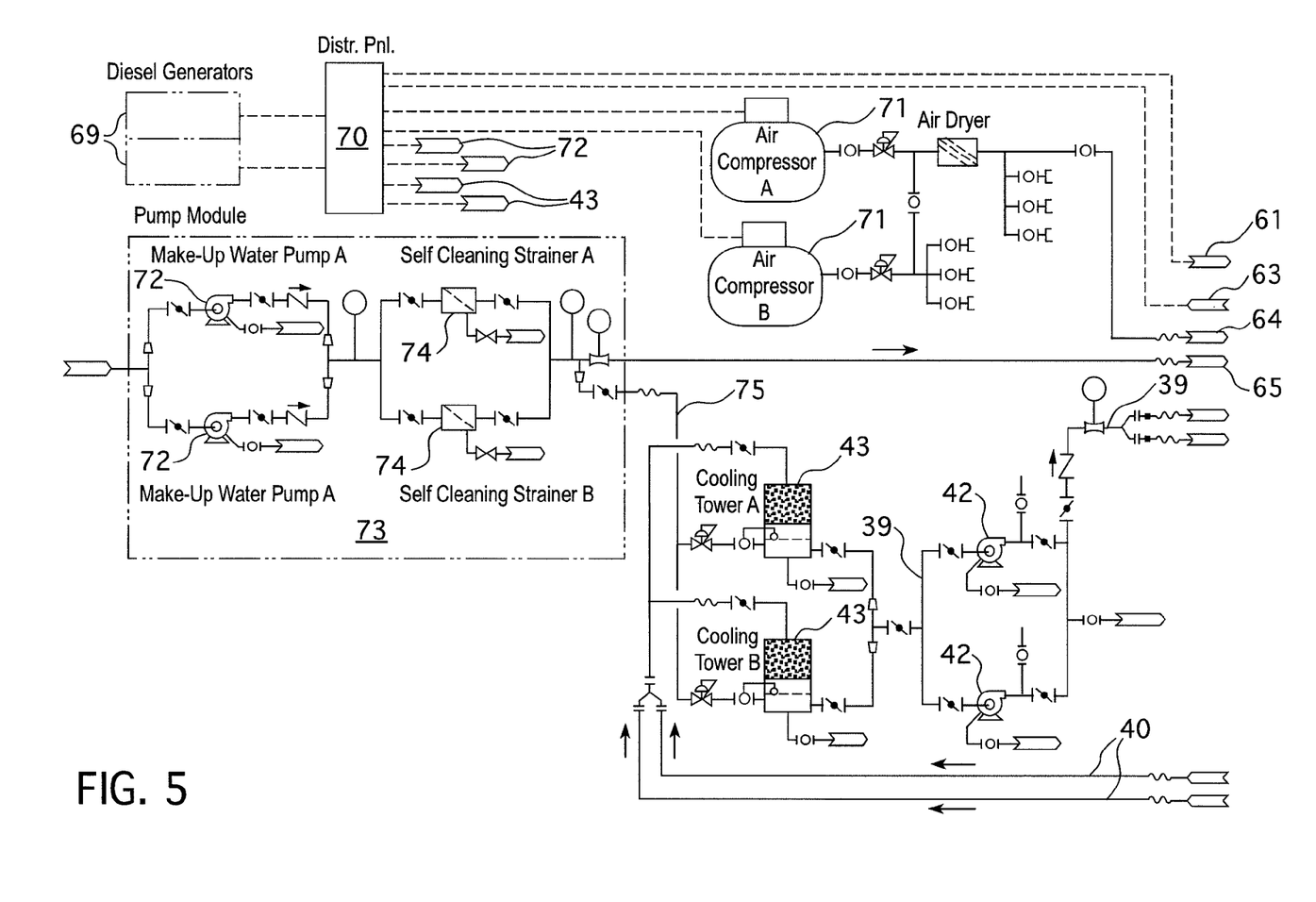
FIG. 5 is a schematic illustration of the portion of the auxiliary residual heat removal system described herein that is situated outside the containment.

FIG. 5 shows the various components of the cooling system of this embodiment that are preferably housed in one or more mobile trailers. One such trailer is figuratively shown in FIG. 3 by reference character 68. Redundant diesel generators 69 provide power through a distribution panel 70 to redundant air compressors 71, redundant make-up water pumps 72 and redundant cooling towers 43. The make-up water system 73 is preferably also housed in the mobile trailers and receives make-up water from any one of several of the sources previously noted through the suction line of redundant make-up water pumps 72. The output of the pumps 72 are fed to redundant parallel self-cleaning strainers 74 which remove particulate matter before the make-up water is communicated to water intake line 65 for transport into the containment to the spent fuel pool. In addition, make-up water can be diverted through make-up water line 75 to refill any depleted secondary coolant in the redundant cooling towers 43.

Thus, this embodiment provides an improved emergency temporary cooling system that supplies self-contained electrical power to run the complete cooling system independently from installed plant electrical sources. The electrical power is provided by redundant portable diesel generators, or other alternate power source, with an electrical panel having breakers and quick disconnects to connect and provide power to all electrical interfaces required to operate the cooling system. This system provides power to both the primary and secondary loops and overcomes a complete loss of plant power. In addition, the system provides a portable air compressor powered by the portable diesel generators to operate all the cooling system valves and instruments independent of the corresponding installed nuclear plant services. The portable air compressor is mounted in the secondary loop mobile vehicle and is pneumatically connected through quick disconnects to the cooling system equipment. The cooling system preferably also provides a method of injecting spent fuel pool make-up water. For this purpose, preferably in the secondary loop transport vehicle, e.g., trailer, van, etc., has a centrifugal or air-operated diaphragm pump with an adequate discharge head to take water from an available external source, e.g., fire hydrant, tanker truck, on-site water storage tank, etc., and pump this water to the spent fuel pool through the pre-installed piping 66, designed for this purpose. The ability to fluidly connect the auxiliary cooling system directly to the nuclear plant's permanent spent fuel pool cooling system and use the existing plant piping infrastructure to circulate primary water to the spent fuel pool and add make-up water, as needed, provides a significant safety benefit with minimal added cost. Additionally, the ability to maintain the secondary loop components at a safe, remote location in trailers so that emergency mobilization following an accident, i.e., an earthquake, tornado, tsunami, hurricane, typhoon, etc., can be quickly and easily implemented is a significant benefit. Further, the use of quick disconnect fittings, flanges and valves on the exterior of the plant buildings to allow for a rapid hookup and remote operation without the need to enter the inside of the reactor building is a significant advantage under such emergency operating conditions.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear power generating facility comprising:
   a composite fuel pool including a reactor cavity and a spent fuel pool fluidly connectable to the reactor cavity, the composite fuel pool at least partially containing a primary fluid;
   a nuclear reactor vessel positioned in the reactor cavity;
   a containment for housing the composite fuel pool and the nuclear reactor vessel;
   a first leg of a primary fluid heat exchange system fluidly connected to the composite fuel pool in a closed loop configuration, the first leg of the primary fluid heat exchange system being entirely, permanently housed within the containment;
   a first pump for circulating the primary fluid into, through and out of the first leg of the primary fluid heat exchange system, the first pump being permanently housed within the containment and having a first set of electrical leads for powering the first pump that is accessible from outside of the containment without entering the containment;
   a cooler situated outside of the containment;
   a second leg of the primary fluid heat exchange system fluidly connected to the cooler and extending from the cooler through a wall of the containment to a heat exchange interface permanently situated within the containment with the first leg of the primary fluid heat exchange system within the containment, the second leg of the primary fluid heat exchange system conveying a coolant fluid between the cooler and the heat exchange interface within the containment, the second leg of the primary fluid heat exchange system having a fluid coupling, disconnectable fitting situated and accessible outside the containment for connecting and disconnecting a first portion of the second leg of the primary fluid heat exchange system that is permanently situated within the containment to or from a second portion of the second leg of the primary fluid heat exchange system that is located outside the containment and connected to the cooler;
   a second pump for circulating the coolant fluid within the second leg of the primary fluid heat exchange system between the heat exchange interface and the cooler, the second pump having a second set of leads for powering the second pump;
   a portable electric generator situated outside the containment and having a connection to the second set of electrical leads for powering the second pump and a connection to the first set of leads for powering the first pump and the portable generator being connectable outside of the containment to the first set of leads and the second set of leads to power the first pump and the second pump through a disconnectable fitting; and
   at least one over the road vehicle for transporting the second portion of the second leg of the primary fluid heat exchange system that is connectable to the cooler and the portable generator.

2. The nuclear power generating facility of claim 1 wherein the at least one vehicle is mobile and houses the cooler.

3. The nuclear power generating facility of claim 1 wherein the at least one vehicle is mobile and houses the second pump.

4. The nuclear power generating facility of claim 1 wherein the first set of electrical leads has a plug or socket connection accessible outside of the containment that mates with a compatible plug or socket connection coupled to the portable electric generator.

5. The nuclear power generating facility of claim 1 wherein the fluid coupling on the second leg of the primary fluid heat exchange system is a mechanical connection.

6. The nuclear power generating facility of claim 1 including a portable air compressor located outside the containment, powered by the portable electric generator and transported by the at least one vehicle, the portable air compressor is connectable through a disconnectable fitting outside the containment to valves on the primary fluid heat exchange system inside the containment to operate the valves.

7. The nuclear power generating facility of claim 1 wherein the primary fluid heat exchange system includes a make-up water system for adding primary fluid to the composite fuel pool.

8. The nuclear power generating facility of claim 1 wherein the second pump is maintained outside of the containment.

9. The nuclear power generating facility of claim 1 wherein the second portion of the second leg of the primary fluid heat exchange system is connected to the coupling on the first portion through a flexible conduit.

* * * * *